United States Patent
Yerli

(10) Patent No.: US 11,050,977 B2
(45) Date of Patent: Jun. 29, 2021

(54) IMMERSIVE INTERACTIVE REMOTE PARTICIPATION IN LIVE ENTERTAINMENT

(71) Applicant: TMRW Foundation IP & Holding SARL, Bettembourg (LU)

(72) Inventor: Cevat Yerli, Frankfurt (DE)

(73) Assignee: TMRW Foundation IP & Holding SARL, Luxembourg (LU)

( * ) Notice: Subject to any disclaimer, the term of this patent is extended or adjusted under 35 U.S.C. 154(b) by 0 days.

(21) Appl. No.: 16/903,407

(22) Filed: Jun. 17, 2020

(65) Prior Publication Data
US 2020/0404219 A1 Dec. 24, 2020

Related U.S. Application Data

(60) Provisional application No. 62/862,793, filed on Jun. 18, 2019.

(51) Int. Cl.
*H04N 7/15* (2006.01)
*H04N 21/2187* (2011.01)
(Continued)

(52) U.S. Cl.
CPC .......... *H04N 7/157* (2013.01); *G06T 15/205* (2013.01); *G06T 19/006* (2013.01); *G06T 19/20* (2013.01); *H04N 21/2187* (2013.01)

(58) Field of Classification Search
CPC ....... G06T 13/40; G06T 19/006; G06T 19/20; G06T 15/205; A63F 13/56; A63F 13/65;
(Continued)

(56) References Cited

U.S. PATENT DOCUMENTS

| 2010/0026809 A1* | 2/2010 | Curry ................. H04N 5/23238 348/157 |
| 2015/0002636 A1* | 1/2015 | Brown ................. H04N 13/356 348/47 |

(Continued)

OTHER PUBLICATIONS

Lindlbauer et al, Remixed Reality: Manipulating Space and Time in Augmented Reaiity, Human Factors in Computing Systems, ACM, Apr. 19, 2018, pp. 1-13, Canada.
(Continued)

*Primary Examiner* — Phung-Hoang J Nguyen
(74) *Attorney, Agent, or Firm* — Fresh IP PLC; Clifford D. Hyra; Aubrey Y. Chen

(57) ABSTRACT

Systems and methods are described for immersive remote participation in live events hosted by interactive environments and experienced by users in immersive realities. Accordingly, a system for immersive remote participation in live events includes a plurality of interactive environments hosting live events and including recording equipment; transmitters coupled to interactive environments; a cloud server having at least a processing unit, memory and at least one renderer, the processing unit being configured to process the respective recordings, to generate interactive volumes on one or more interactive elements, to generate immersive experiences for viewers utilizing the processed data and interactive volumes, and to process viewer feedback to one or more of the plurality of interactive environments, and the renderer being configured to render image data from the immersive experiences to generate media streams that are sent to the one or more viewers; and one or more interaction devices configured to receive the processed and rendered media streams having the immersive experiences and to input feedback to the live interactive environments sent by the cloud server.

23 Claims, 7 Drawing Sheets

(51) Int. Cl.
*G06T 15/20* (2011.01)
*G06T 19/20* (2011.01)
*G06T 19/00* (2011.01)

(58) Field of Classification Search
CPC ............ A63F 13/358; A63F 2300/8082; A63F 13/216; H04L 67/38; H04N 7/157; H04N 21/2187
See application file for complete search history.

(56) References Cited

U.S. PATENT DOCUMENTS

| | | | |
|---|---|---|---|
| 2017/0259115 A1* | 9/2017 | Hall | G06F 19/00 |
| 2018/0374268 A1 | 12/2018 | Niles | |
| 2019/0099678 A1 | 4/2019 | Khan et al. | |
| 2019/0246066 A1* | 8/2019 | Rosenberg | G02B 30/00 |
| 2019/0294313 A1* | 9/2019 | Lee | G06F 3/04883 |
| 2019/0321683 A1* | 10/2019 | Yerli | H04N 21/4223 |
| 2019/0374857 A1* | 12/2019 | Deller | G06T 13/40 |

OTHER PUBLICATIONS

Cheok et al, Human Pacman: a mobile, wide-area entertainment system based on physical, social, and ubiquitous computing, Personal and Ubiquitous Computing, vol. 8, No. 2, Springer-Verlag London Limited, Published online: Apr. 30, 2004, United Kingdom.
Search Report for European Patent Appiication EP20130745, dated Oct. 9, 2020.

* cited by examiner

IMMERSIVE INTERACTIVE REMOTE PARTICIPATION IN LIVE ENTERTAINMENT

CROSS-REFERENCE TO RELATED APPLICATIONS

This application claims priority to U.S. Provisional Application No. 62/862,793, filed Jun. 18, 2019, which is hereby incorporated by reference in its entirety.

FIELD OF THE INVENTION

The present invention relates to interactive remote participation in live events and entertainment and, more particularly, to systems and methods for immersive remote participation in live events hosted by interactive environments and experienced by users in immersive realities.

BACKGROUND

Live events and entertainment are often provided to a remote audience, for example, via traditional television (TV) broadcasting or other distribution methods. However, the remote audience is often limited to an observation of the live event and there is typically no possibility for interaction with the live event. In particular, old-fashioned TVs only allow receiving the broadcasted data and have no capabilities to transfer any feedback on the live event watched via the TV broadcasting. Thus, any feedback, such as a telephone call or a written opinion sent to the broadcaster or organizer of the live event or entertainment, is typically delayed with regard to the live event and may not directly and instantaneously influence the live event and the course of action of the live event. At the most, only the local spectators may contribute to the live event if the live event and the number of spectators are limited. Also, live events are typically hosted and managed by separate organizers and any received feedback is typically processed separately from each other, often requiring separate organizational structures. However, from a point of view of an organizer, it would be desirable to have the capability to manage and broadcast several independent live events and to receive and process any feedback on one of these live events through a centralized infrastructure.

Additionally, traditional TV broadcasting limits the type of experiences that can be provided to the remote audience to two-dimensional images seen from a screen, not enabling the audience to have immersive experiences (e.g., digital realities such as virtual reality, augmented reality, and mixed reality) that can enhance the interaction possibilities and enjoyment of the audience. The broadcasting of these live events includes transmitting images to viewers that may be viewed via channels such as a TV set, a set-top box, personal computers (PCs), game consoles, mobile phones, laptops, mobile game consoles, and the like. However, in order to provide immersive interactive experiences, data required to produce these experiences is primarily downloaded and hosted on the client side, resulting in high hardware demands to execute the applications. Reducing hardware and network demands along with adoption barriers for digital realities motivates the desire to offload computationally intensive tasks to one or more powerful remote servers, or cloud servers. However, current architecture employed for remote rendering is optimized for the delivery of static, predefined content with minimal levels of dynamic interactions.

Given the above, there exists a need for new systems and methods for immersive, interactive remote participation in live events.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In general, the present invention in its various embodiments enables direct and instantaneous participation of a remote audience in live events and entertainment, enables a flexible management of live events as well as the feedback received from the remote audience, and enables continuous, real-time cloud-rendered immersive experiences for the remote audience.

A system for remote participation in live events, according to embodiments of the present invention, comprises a plurality of interactive environments, each hosting a live event and including equipment configured to continuously record the interactive environment. The system further comprises one or more transmitters coupled to the plurality of interactive environments, wherein the transmitter is configured to receive from each interactive environment the respective recording and to transfer each recording. The system further comprises a cloud server with one or more remote servers comprising at least a processing unit, memory and at least one renderer, the processing unit comprising computing resources sufficient to process the respective recording of one or more of the plurality of interactive environments, to generate interactive volumes on one or more interactive elements, to generate immersive experiences for viewers utilizing the processed data and interactive volumes, and to process viewer feedback to one or more of the plurality of interactive environments, and the renderer comprising computing resources sufficient to render image data from the immersive experiences to generate media streams that are sent to the one or more viewers. The system further comprises one or more interaction devices configured to receive the processed and rendered media streams comprising the immersive experiences and to input feedback to the live interactive environments sent by the cloud server, wherein the viewer feedback comprises passive manipulation and active manipulation instructions, the passive manipulation instructions prompting the processing unit to only update the immersive content sent to the interaction devices, and the active manipulation instructions prompting the processing unit to update the live event along with the immersive content.

The processing unit and renderer may be located separate from each other, but may, preferably, be provided within the same system, such as, for instance, in a cloud server. Remote viewers may interact with the immersive content via suitable channels, such as, for example, interaction devices (e.g., TV set, a set-top box, PCs, game consoles, mobile phones, laptops, mobile game consoles, head-mounted displays, see-through devices, and the like) connected to a network. Preferably, in order to provide immersive experiences, interaction devices include, but are not limited to, immersive reality devices, such as head-mounted displays or see-through devices (e.g., digital reality contact lenses). Antennas may be configured to provide communication between the different elements of the system (i.e., user devices, cloud server, and live events) and tracking services that may enhance the experience of the remote audience. The interaction devices may be configured to perform lightweight computational tasks and light rendering operations on immersive content sent by the cloud server, and to provide feedback to each of immersive content from the cloud server. Preferably, in order to provide low-latency communication and tracking services and high quality of service (QOS) antennas connected to the system may millimeter-wave (mmW) or combinations of mmW and sub 6 GHz communication systems, such as through 5th generation wireless systems communication (5G) which, leveraging both sub 6 GHz and mmW frequency space, may provide ubiquitous coverage and network capacity to elements of the system.

Each interactive environment may comprise suitable equipment capable of providing the required functionality for performing the live event and/or entertainment. For example, the interactive environment may be a television studio, concert hall, or a sports stadium, including one or more recording means, such as television and video cameras, as well as interactive means for providing the received feedback within the interactive environment, such as display boards, communication means coupled to the performers and players of the live event, as well as feedback means directly influencing the configuration of the interactive environment, for example, affecting lifting ramps, lighting, the recording means, and others. In some embodiments, the recording equipment further includes Light Detection and Ranging (LIDAR) devices mounted thereon in order to provide precise distance and depth information of the live event. The interactive environment may also be a computer-generated environment, entirely produced by one or more processing units of the cloud server, such as a virtual, interactive scene, ad, application or game, wherein the recording means may comprise rendering modules and the feedback means may be provided by interfaces affecting the virtual scene, ad, application or game. However, it is to be understood that the interactive environment may also comprise one or more combinations thereof, resulting in the mixing of a real-world interactive environment with a computer-generated scenario, such as in a mixed-reality (MR) interactive environment. For example, the live event may include a sports match, a concert, a television show, a political speech, a party, a live conference, a seminar or other academic courses, board meetings, a concurrent and synchronous experienced game-session, live collaborative engagement of multiple users, auctions, voting sessions, e-commerce and live shopping, amongst others.

The transmitter coupled to each of the interactive environments hosting the respective live event and the processing unit receiving and/or processing the feedback may be provided within one processing system, such as on a cloud server. However, the transmitter and the processing unit may also be provided on separate processing systems and may also be provided in different locations. For example, the processing unit may be located in spatial proximity to the interactive environments, whereas the transmitter may be located at an environment or facility providing the functionality to transfer the recordings to the remote viewers, such as a broadcasting station.

According to an embodiment of the present invention, interaction devices may include various system components, such as, for example, an input/output module, a power source, a memory, sensors, and a mmW transceiver, all operatively connected to a processing unit. The sensors may be implemented as computing software and hardware adapted to obtain various telemetry metadata from users. For example, the sensors may include one or more of an Inertia Measuring Unit (IMU), accelerometers, and gyroscopes, amongst others. The IMU is configured to measure and report the velocity, acceleration, angular momentum, speed of translation, speed of rotation, and other telemetry metadata of the interaction device by using a combination of accelerometers and gyroscopes. Accelerometers within the IMU may be configured to measure the acceleration of the interaction device, including the acceleration due to the Earth's gravitational field. In one embodiment, accelerometers within the IMU may include a tri-axial accelerometer that is capable of measuring acceleration in three orthogonal directions. In other embodiments one, two, three, or more separate accelerometers may be included within the IMU. In other embodiments, additional accelerometers and gyroscopes may be included separate from the IMU. The mmW transceivers may be implemented as computing software and hardware configured to enable the interaction devices to receive mmW wave signals from the antennas and to send the data back to antennas when interacting with immersive content. In other embodiments, the mmW transceivers may also enable real-time positional tracking of the interaction devices. The mmW transceiver may be a two-way communication mmW transceiver.

According to embodiments of the invention, combining the capabilities of the sensors (i.e. IMU, accelerometers, and gyroscopes) with the positional tracking provided by the mmW transceivers and the accurate tracking, low-latency and high QOS capabilities provided by mmW antennas may enable sub-centimeter or sub-millimeter positional and orientational tracking of interaction devices, which may increase accuracy when tracking the real-time position and orientation of the interaction devices and may improve the general user experience when interacting with immersive content.

Thus, the present invention in its embodiments provides a low-latency, high QOS communication channel from each of the remote viewers, or audience, back to the provider of the recording of the live event and the interactive environment. With these and other capabilities, a system according to an embodiment of the invention may be especially suitable for providing immersive content to users. For example, one or more parts of the immersive content may include augmented reality (AR), virtual reality (VR), or mixed reality (MR) content.

According to an embodiment of the invention, the renderer within the cloud server may create interactive volumes on each of the interaction elements (e.g., people, objects, stage, etc.), enabling remote viewers to passively or actively manipulate each of the interaction elements. These interactive reality volumes may be created by distance interpolation methods applied on the interaction elements to calculate the height and shape of each of the elements. However, other techniques known in the art may be used in order to create interactive reality volumes. Additionally, a content database within the memory of the cloud server may contain information of the various interaction elements. For example, the content database may include statistics, biographies, etc., of people; specific details of objects located within the live event, if available; and live event stage highlights, features, dimensions, history, capacity, and the like.

The incoming data, such as the feedback and any further data from the remote viewers, is processed by the at least one processing unit and directly, for example, instantaneously or with a short delay only, provided to the related interactive environment hosting the live event. The at least one processing unit may be configured to directly invoke an action within the affected interactive environment or may transfer the processed data to the environment, such that the interactive environment further processes the data and determines a suitable action based on the feedback and/or the processed data. The request may include passive or active manipulation instructions. The passive manipulation instructions may request further information from elements found in the live event, may modify views, or may perform any other action that does not require an immediate modification of the live event. The active manipulation instructions may directly affect the course of action within the live event, such as, for instance, affecting sounds, lighting, fog, inserting messages, changing the course of the live event through votes, etc. For example, the processed data may be presented within the interactive environment, i.e., at the location of the live event. Such presentation may be, in turn, recorded by the corresponding recording equipment and transferred to the remote viewer, therefore creating an immediate response on the feedback of the remote viewer.

In preferred embodiments, user interaction with immersive content may be gesture-enabled, whereby remote viewers may employ one or more gestures for providing feedback to the processing unit. For example, the gestures can be natural user interface (NUI) gestures. NUI may be defined as any interface technology that enables remote viewers to naturally interact with immersive content free from artificial constraints imposed by input devices such as mice, keyboards, remote controls, and the like.

The present invention in its various embodiments further provides various interaction methods with the interaction elements found within an interactive environment. For example, remote viewers may view and interact with interaction elements by being virtually teleported to a live event, simulating an experience for the remote viewers in a way that they may feel present at the live event from the comfort of their home or any other selected place. In another example, the live event may as well be virtually projected to remote viewers, which may view the live event such that interaction elements may overlap real-life elements surrounding the remote viewers.

Based on the live event, the type of feedback received from remote viewers, the available set of actions for the remote viewers, and the presentation capabilities of the interactive environment hosting the live event, interaction elements of the live event may be actively manipulated and updated based on individual feedback or group feedback. In the case of individual feedback, the processing unit may update the live event based on the feedback received from one or more individual remote viewers. For the case of group feedback, the processing unit may update the live event by gathering and calculating the predominant feedback through statistical methods and then updating the event accordingly. Group feedback may be based on feedback gathered from the totality of remote viewers watching a live event, or from selected groups of remote viewers. The individual remote viewers or selected groups of remote viewers may be selected randomly or by using other methods, such as based on special permissions or security entitlements that users may access through a subscription fee or other methods. For example, the selected or all of the viewers may be asked to provide an opinion or vote on a particular event. The processing unit may collect the answers for a predetermined amount of time and may generate a value, such as an average value of the received feedback data. For example, the processing unit may poll votes on a plurality of choices for a couple of seconds or minutes and may trigger the affected interactive environment to display the results of the survey. However, it is to be understood that the processing unit may also process one feedback after another and consecutively update the determined interactive environment. A method for processing of feedback, such as input received from a plurality of users applicable in the method, is disclosed in U.S. Provisional Application No. 61/311,827. A method for controlling entities of live events applicable in the method is disclosed in U.S. Provisional Application No. 61/311,834.

In a preferred embodiment of the present invention, the system further comprises one or more feedback channels to couple at least some of the remote viewers to the processing unit, wherein each feedback channel is associated with one interactive environment. Each feedback channel may be established whenever at least one remote viewer starts receiving the recording of a desired live event. In such case, the remote viewer may register at the system and request the recording of the live event. The system may directly connect the remote viewer to the feedback channel associated with the respective interactive environment. Thus, one or more remote viewers of an interactive environment may provide feedback to the processing unit via one feedback channel associated with the interactive environment being watched by the remote viewers. In addition, each remote viewer may be coupled to the processing unit via a newly created feedback channel. The system may register the remote viewer and the related feedback channel at the processing unit. For example, the processing unit may comprise a memory storing information linking each registered remote viewer to one or more interactive environments hosting live events that are being watched by the remote viewer. However, it is to be understood that one feedback channel may also be linked to each remote viewer receiving at least one recording. Thus, each remote viewer may communicate with the processing unit using a distinct feedback channel irrespective of the number of recordings that are being watched by the remote viewer.

According to an embodiment of the present invention, the system further comprises one or more transfer channels, each associated with one interactive environment, wherein the processing unit is configured to transfer the recording of an interactive environment to at least some of the remote viewers via the associated transfer channels.

In a further embodiment of the present invention, the system further comprises a security component configured to authenticate a remote viewer and to authorize participation of the remote viewer in one of the interactive environments. Each remote viewer may connect to the security component and may use an authentication and/or security protocol to authenticate at the system. For example, the user may provide a password or other authentication data to prove its identity. Also, any other suitable authentication approach may be used providing the desired level of security, such as challenge-response authentication using smart cards and other cryptographic and security methods. After authentication, the remote viewer may also request participation at a live event. For example, the system may require the remote viewer to provide further authentication or may check a security level of the remote viewer enabling the remote viewer to participate. The security component may also require the remote viewer to confirm the participation including payment of fees for the participation. Also, the remote viewer may be directly allowed to participate. However, if a particular feedback from that user is received by the processing unit, the remote viewer may be asked to pay for the desired interaction.

According to another embodiment of the present invention, the processing unit comprises a middleware module configured to asynchronously organize the communication between the processing unit and the plurality of remote viewers. The middleware module may be run on one or more processing devices and may comprise the processing unit. The middleware module may expose a plurality of network connections receiving the feedback of the remote viewers and transferring the data processed by the processing unit to the respective interactive environments. The middleware module may run a plurality of threads, each receiving feedback from one of the feedback channels, which may also buffer and pre-process the received feedback. For example, each thread may asynchronously determine an identification of the remote viewer and respective associations to interactive environments. In addition, each thread may extract from each feedback the data identifying the live event related to the feedback. Each thread may also determine the actions available in the respective interactive environment and may determine a suitable action that is to be invoked in the interactive environment in response to the feedback. Thereafter, each thread may pass the pre-processed feedback data to the processing unit, which may further analyze the data and either pass it to the affected interactive environment and/or directly invoke the suitable action within the affected interactive environment.

In an embodiment of the present invention, based on the received feedback, the processing unit is configured to generate a visual representation and to update the interactive environment by displaying the visual representation within the interactive environment.

According to a further embodiment of the present invention, each feedback includes a tag specifying an occurrence during the live event. The live event may comprise a sequence of occurrences, such as certain actions performed by actors or players of the live event or virtual characters of a computer-generated interactive environment, and each feedback may be related to one of these occurrences. For example, each occurrence may be associated with a time stamp and/or duration. The corresponding feedback may specify a certain point in time which falls into the time span identified by the time stamp and/or duration. Also, each occurrence may be associated with a unique identifier and the feedback may include the identifier.

According to an embodiment of the present invention, each live event is preferably one of a sports event, a cultural event, a social event, a television show, a political speech, a live conference, and a board meeting, amongst others. Also, a live event may be any event taking place in a real-world environment. However, it is to be understood that each live event may also at least partially comprise computer-generated objects and/or enhancements, such as computer-augmented parts of the real-world environment. Yet, the interactive environment may also preferably be a computer-generated environment, including at least one of a concurrently or synchronously experienced game-session, a live collaborative engagement of users, e-shopping, an auction, a crowdfunding activity, and a social environment.

Even though, the disclosed system and embodiments thereof have been described by means of exemplary embodiments, it is to be understood that the present disclosure is not limited to a particular live event as well as related processing and mode of participation and interaction, such as watching a sports event, interacting with a theatre performance or show, participating in a television or game show, participating in a board meeting, participating in an auction, performing e-commerce and live shopping, and/or being involved in a digital game tournament or an online crowd game or crowdfunding activities. Rather, any live event which may be recorded or created by a computer system and transmitted to a remote audience may be hosted by a system according to an embodiment of the present invention, enabling the remote audience to directly participate and influence the live event.

According to an embodiment of the present invention, the memory of the cloud server stores a persistent virtual world system comprising at least one virtual replica of a corresponding real object, wherein the virtual 3D world coordinates and virtual properties of the virtual replicas are based on the 3D world coordinates and properties of the real objects, and wherein the plurality of interactive live environments is continuously updated in the persistent virtual world system.

A method for remote participation in live events, according to embodiments of the present invention, comprises the steps of providing a plurality of interactive environments, each interactive environment hosting a live event; continuously recording the plurality of interactive environments via equipment therein configured; receiving by a cloud server the recording of the interactive environments, wherein the cloud server includes one or more remote servers comprising at least a processing unit, memory and at least one renderer; processing, by the at least one processing unit, the respective recording of one or more of the plurality of interactive environments and generating interactive volumes on interactive elements; generating by the at least one processing unit immersive experiences utilizing the processed data and interactive volumes on interactive elements; rendering, by the at least one renderer, the immersive experiences to generate immersive media streams that are sent to the one or more viewers via interaction devices; receiving viewer feedback related to one or more of the immersive experiences linked to the live events, wherein the feedback comprises passive manipulation and active manipulation instructions, the passive manipulation instructions prompting the processing unit to only update the immersive content sent to the interaction devices, and the active manipulation instructions prompting the processing unit to update the live event along with the immersive content; and updating, by the at least one processing unit and renderer, the interactive environment by initiating an action within the interactive environment, or updating the immersive content on the processed feedback, or combinations thereof.

The method improves the handling of live events being watched by a plurality of remote viewers and enables a direct interaction and participation of the remote viewers with the live events.

In an embodiment of the current invention, the method further comprises asynchronously organizing communication with the plurality of remote viewers using a middleware module, wherein the middleware module is configured to expose a plurality of network connections for receiving the feedback of the remote viewers and transferring processed data to the determined interactive environment of the plurality of interactive environments, wherein the middleware module is further configured, if one of the plurality of remote viewers is participating in more than one live event, to filter all requests and feedback of the one remote viewer towards a correct live event session so that data is stored and processed in connection to a respective live event session.

In an embodiment of the current invention, the method further comprises further comprising virtually transporting one or more viewers to a live event, or projecting and mapping a live event against surrounding areas of the one or more viewers.

In an embodiment of the present invention, the method further comprises providing one or more feedback channels, each feedback channel to transfer feedback associated with one of the interactive environments.

According to another embodiment of the present invention, the method further comprises providing one or more transfer channels, each transfer channel to transfer the recording of one interactive environment to at least some of the remote viewers.

In an embodiment of the present invention, the transfer channels and the feedback channels are provided within one network.

In yet another embodiment of the present invention, the method further comprises authenticating a remote viewer and authorizing participation of the remote viewer in one of the virtual environments.

Preferably, the method further comprises asynchronously organizing communication with the plurality of remote viewers.

According to an embodiment of the present invention, the method further comprises receiving from at least one of a plurality of local viewers in an interactive environment feedback related to the local live event and, based on the received feedback, updating the local interactive environment.

According to another embodiment of the present invention, the transferring the recording includes broadcasting and/or streaming the recording via at least one of the transfer channels.

According to an embodiment of the present invention, the method further comprises, at each remote viewer, receiving and rendering at least one recording and generating feedback on the displayed at least one recording.

Preferably, the method further comprises, based on the received feedback, generating a visual representation and updating the interactive environment by displaying the visual representation within the interactive environment.

According to an embodiment of the present invention, the method further comprises providing the memory of the server a persistent virtual world system comprising at least one virtual replica of a corresponding real object, wherein the virtual 3D world coordinates and virtual properties of the virtual replicas are based on the 3D world coordinates and properties of the real objects, and wherein the plurality of interactive live environments are continuously updated in the persistent virtual world system.

Furthermore, a non-transitory computer-readable medium, according to embodiments of the present invention, has instructions stored thereon, the instructions, when installed and executed on a computing device, causing the computing device to perform a method according to at least one embodiment the present invention. In particular, the instructions may be directly read or downloaded, installed, and executed in one or more interactive environments, each hosting a live event, and may cause recording equipment in each interactive environment to record the interactive environment or a renderer in a cloud server to generate the interactive environment, and to transfer the recording or generated interactive environment to a transmitter. Correspondingly, the instructions may also be directly read or downloaded, installed, and executed on the transmitter, causing the transmitter to receive the respective recording and transfer each recording to at least some of a plurality of remote viewers. Said instructions may also be directly read or downloaded, installed, and executed on a computing device of each remote viewer, enabling the remote viewer to watch at least some of the recordings and send feedback related to one of the live events. Furthermore, the instructions may also be directly read or downloaded, installed, and executed on a processing unit, configuring the processing unit to receive feedback related to one of the live events from two or more of the remote viewers, to determine, based on the feedback, an interactive environment hosting the related live event, and to update the determined interactive environment and/or the immersive content sent to viewers based on the feedback.

These and further and other objects and features of the invention are apparent in the disclosure, which includes the above and ongoing written specification, as well as the drawings. The above summary does not include an exhaustive list of all aspects of the present disclosure. It is contemplated that the disclosure includes all systems and methods that can be practiced from all suitable combinations of the various aspects summarized above, as well as those disclosed below herein.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

DETAILED DESCRIPTION

Figure 1:
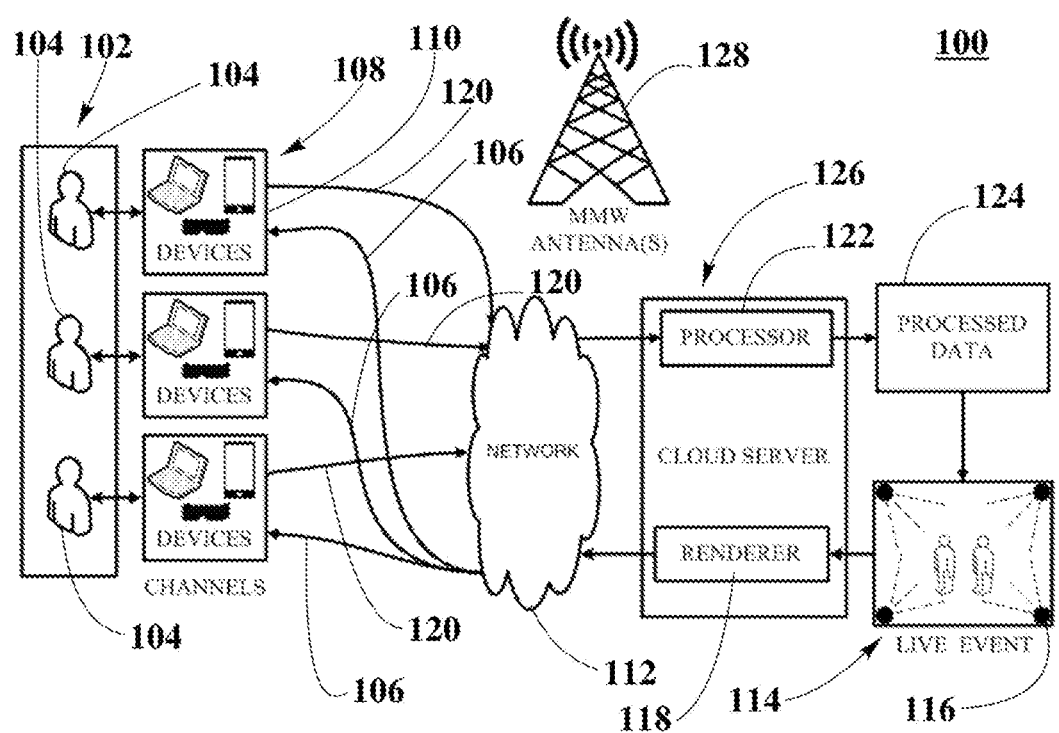
FIG. 1 shows a schematic representation of a system, according to an embodiment of the present invention.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Generally, the present invention in its various embodiments enables direct and instantaneous participation of a remote audience in live events and entertainment, enables a flexible management of live events as well as the feedback received from the remote audience, and enables continuous, real-time cloud-rendered immersive experiences for the remote audience.

FIG. 1 shows a schematic representation of a system 100 according to an embodiment of the present invention. The system 100 enables a remote audience 102, including remote viewers 104, to view and interact with immersive content 106 via channels 108, for example, interaction devices 110 such as a TV set, a set-top box, PCs, game consoles, mobile phones, laptops, mobile game consoles, head-mounted displays, see-through devices, and the like, connected to a network 112. Preferably, in order to provide immersive experiences, interaction devices 110 include immersive reality devices, such as head-mounted displays or see-through devices (e.g., digital reality contact lenses).

The remote audience 102 may be connected to one or more live events 114 that, once recorded, processed, rendered, and transmitted, are accessed by the remote audience 102 as immersive content 106 via any suitable digital network 112 such as the Internet that is accessed by the interaction devices 110. The live event 114 may be recorded using recording equipment 116 such as cameras and microphones, rendered via a renderer 118 and thereafter transmitted to the remote audience 102. In some embodiments, the recording equipment 116 includes Light Detection and Ranging (LIDAR) devices mounted thereon in order to provide precise distance and depth information of the live event 114. The remote audience 102 may interact with and enter feedback 120 on the immersive content 106 via channels 108 to at least one processing unit 122, either by a using the same interaction device 110 with which the user views the immersive content 106, or through another interaction device 110. According to an embodiment, the interaction devices 110 may be configured to perform lightweight computations and light rendering operations on immersive content 106 sent by a cloud server 126 comprising the at least one processing unit 122 and receiving the recording of the live event 114. The at least one processing unit 122 of the cloud server 126 collects all feedback 120 from each individual remote viewer 104 and generates processed data 124 that is thereafter used to update the one or more live events 114 or to update only the local view of remote viewers 104. Preferably, the processing unit 122 and the renderer 118 may be provided within one processing system, such as in a cloud server 126. The cloud servers 126 may be located in compute centers (not shown) located nearest to the live event and to the remote viewers 104. The at least one processing unit 122 may additionally process data from the live events before being rendered and sent as immersive content to the remote audience 102.

System 100 may further include connection antennas 128 configured to provide communication between the different elements of system 100 (such as, for instance, interaction devices 110, cloud server 126, and live events 114) and tracking services that may enhance the experience of the remote audience 102. In some embodiments, the antennas 128 are connected through wired means to the compute centers. In other embodiments, the antennas 128 are provided within the compute centers and/or areas serviced by compute centers.

In an embodiment of the invention, in order to reduce hardware and network demands, contribute to the reduction of network latency, and improve the general digital reality experience, the system may connect through a network 112 including millimeter-wave (mmW) or combinations of mmW and sub 6 GHz communication systems, such as through 5th generation wireless systems communication (5G). In other embodiments, the system may connect through wireless local area networking (Wi-Fi) providing data preferably at 16 GHz. Provided communication systems may allow for about 1 to about 5 millisecond end-to-end (E2E) latency and 1-10 Gbps downlink speeds to end points in the field, resulting in high quality, low latency, and real-time immersive content streaming. In other embodiments, the system may communicatively connect through 4th generation wireless systems communication (4G), may be supported by 4G communication systems, or may include other wired or wireless communication systems.

In other embodiments of the invention, global navigation satellite systems (GNSS), which refers collectively to multiple satellite-based navigation systems like GPS, BDS, Glonass, QZSS, Galileo, and IRNSS, may be used for enabling positioning of interaction devices. Employing signals from a sufficient number of satellites and techniques such as triangulation and trilateration, GNSS can calculate the position, velocity, altitude, and time of devices. In a preferred embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 16 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

The immersive content 106 may include at least one of the following: image data, 3D geometries, video data, audio data, textual data, haptic data, or a combination thereof. In these embodiments, one or more parts of the immersive content 106 may include augmented reality (AR), virtual reality (VR), or mixed reality (MR) digital content. The AR digital content may include physical, real-world environment elements augmented by computer-generated sensory input such as sound, video, graphics, or GPS data. Augmentation techniques are typically performed in real-time and in semantic context with environmental elements, such as overlaying supplemental information or virtual objects in the real world. The AR digital content allows information about the surrounding real world of a remote viewer 104 or virtual objects overlay in the real world to become interactive and digitally manipulable. The VR digital content may include virtual elements that are used to replace the real world with a simulated one. The MR digital content may include a mixture of augmented physical, real-world environment elements interacting with virtual elements. For example, an MR experience may include a situation where cameras capture real humans. Subsequently, suitable computer software creates a 3D mesh of the humans that is then inserted into a virtual world and is able to interact with the real world.

In preferred embodiments of the present invention, user interaction with digital content may be gesture-enabled, whereby a remote viewer 104 employs one or more gestures for providing feedback 120 to the processing unit 122. For example, the gestures can be natural user interface (NUI) gestures. NUI may be defined as any interface technology that enables a remote viewer 104 to naturally interact with immersive content 106 free from artificial constraints imposed by input devices such as mice, keyboards, remote controls, and the like. Non-limiting examples of NUI methods include, for instance, those methods that employ gestures, such as tactile and non-tactile interfaces such as speech recognition, touch recognition, facial recognition, stylus recognition, air gestures (e.g., hand poses and movements and other body/appendage motions/poses), head and eye tracking, voice and speech utterances, and machine learning related at least to vision, speech, voice, pose, and touch data, for example.

NUI technologies include, but are not limited to, touch sensitive displays, voice and speech recognition, intention and goal understanding, motion gesture detection using depth cameras (e.g., stereoscopic camera systems, infrared camera systems, color camera systems, and combinations thereof), motion gesture detection using accelerometers/gyroscopes, facial recognition, 3D displays, head, eye, and gaze tracking, immersive augmented reality and virtual reality systems (e.g., HoloLens™, by Microsoft Corporation, or Oculus Rift™), all of which provide a more natural user interface, as well as technologies for sensing brain activity using electric field sensing electrodes (e.g., electro-encephalograph (EEG) and other neuro-biofeedback methods.

The live event 114 may preferably be any typical live event that may be delivered, digitally distributed, or broadcasted to a remote audience 102, such as a sports match, a concert, a television show, a political speech, a party, a live conference, a seminar or other academic courses, board meetings, a concurrent and synchronous experienced game-session, live collaborative engagement of multiple users, digital auctioning, voting sessions, e-commerce and live shopping, amongst others. However, the live event 114 may also be a computer-generated interactive environment, entirely produced by one or more processing units, such as a virtual, interactive scene or game, wherein the recording means may include renderers 118 and the feedback 120 means may be provided by interfaces affecting the virtual scene or game. However, it is to be understood that the interactive environment may also comprise a combination thereof, resulting in mixing a real-world interactive environment with a computer-generated scenario.

According to another embodiment, the renderer 118 within the cloud server 126 is able to create interactive volumes that remote viewers 104 may interact with to enjoy further experiences with the immersive content 106. Further in this embodiment, a content database (not shown) may be configured within the memory of the cloud server 126 to include information of the different elements within the live event 114.

The incoming feedback data may preferably be processed into a presentable format. The format may differ depending on the live event 114, the available set of actions for the remote audience 102, as well as presentation capabilities of the interactive environment hosting the live event 114. Furthermore, the processed data 124 may represent a collective feedback 120 in which each remote viewer 104 may provide the same type of feedback 120 with a different value, such as a vote, or in which a chosen group of remote viewers 104 chosen randomly or using other methods, or in which selected individual remote viewers 104, may return personalized feedback 120.

The processing unit 122 may collect all incoming feedback data from the remote audience 102. The processing unit 122 may process the received feedback 120 into processed data 124 and may determine whether to directly and instantaneously update, modify and/or affect the live event 114 and the resulting immersive content 106 or whether to only update, modify and/or affect the immersive content 106. After processing, the processing unit 122 may transfer the processed data 124 to the interactive environment hosting the live event 114 via a suitable network.

A method for processing of feedback 120, such as input received from a plurality of users applicable in the method, is disclosed in U.S. Provisional Application No. 61/311,827, the disclosure of which is incorporated by reference herein.

A system and method for providing augmented reality through a simulation engine is disclosed in U.S. patent application Ser. No. 13/689,643, filed on Nov. 29, 2012, by the same inventor of the current disclosure, and is herein incorporated by reference. Moreover, U.S. patent application Ser. No. 13/689,632, and filed on Nov. 29, 2012, by the same inventor of the current disclosure discloses a system and method for creating a virtual reality environment based on the recording of a real scene, and is herein also incorporated by reference.

In some embodiments of the present invention, a transmitter (not shown) may be coupled to each of the interactive environments hosting the respective live event 114 providing the functionality to transfer the recordings to the remote viewers 104. The transmitter coupled to each of the interactive environments hosting the respective live event 114 and the processing unit 122 unit receiving and/or processing the feedback 120 along with the processing unit 122 and the renderer 118 rendering the captured live event 114 may be provided within one processing system, such as on a cloud server 126. However, the transmitter and the processing unit 122 and renderer 118 may also be provided on separate processing systems and may also be provided in different locations. For example, the processing unit 122 and renderer 118 may be located in spatial proximity to the interactive environments, whereas the transmitter may be located at an environment or facility providing the functionality to transfer the recordings to the remote viewers 104, such as a broadcasting station.

It is to be understood that while the remote audience 102 is preferably physically separate from the other components of system 100, the processing unit 122, the transfer system providing channels 108, and the interactive environment hosting the live event 114 may also be located in the same location or in spatially proximate locations. However, the processing unit 122, the transfer system, and the interactive environment may also be provided in remote locations as well. Similarly, at least some of the remote viewers 104 may also be directly present at the live event 114, thus forming at least a part of the local audience.

Figure 2:
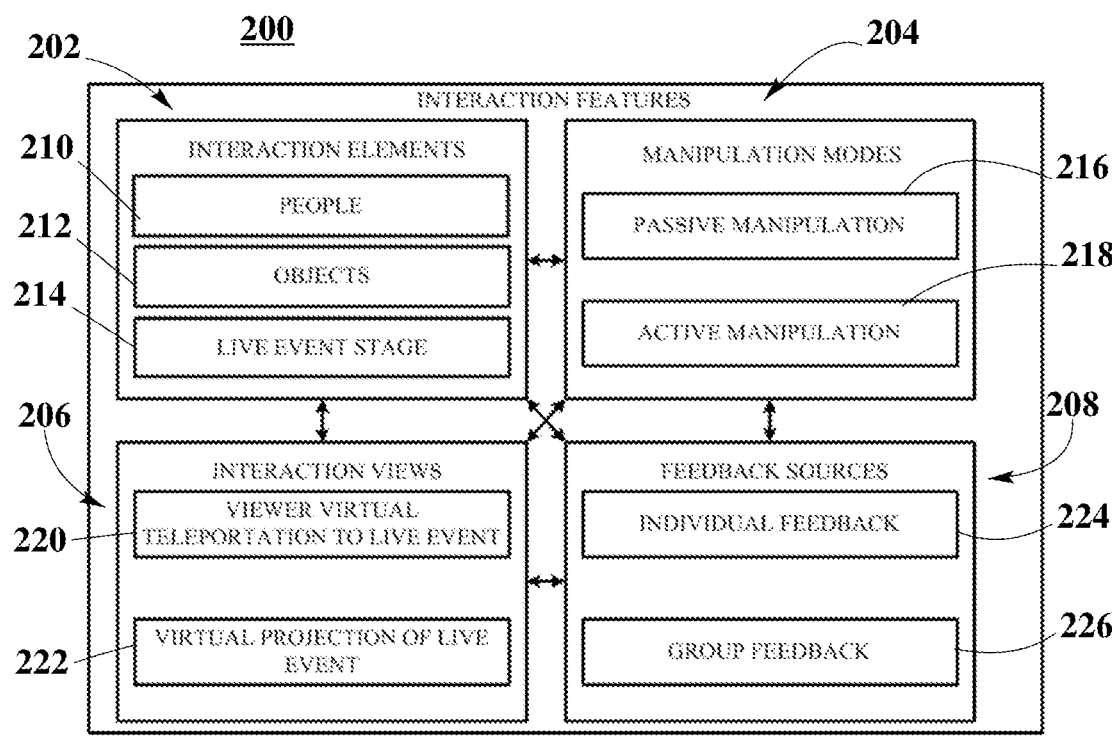
FIG. 2 shows a schematic illustration of immersive interaction features, according to an embodiment of the present invention.

FIG. 2 shows a schematic illustration of immersive interaction features 200 according to an embodiment of the present invention. Immersive interaction features 200 include interaction elements 202, manipulation modes 204, interaction views 206, and feedback sources 208.

Interaction elements 202 may refer to elements found within the interactive environments of live events and which users may be able to view and interact with via suitable channels (e.g., channels 108 in FIG. 1). Interaction elements 202 may refer to people 210, such as performers, event participants, live audience, etc.; objects 212, such as sports equipment, electronic devices, etc.; and live event stage 214, including walls, platforms, sports pitches, stadiums, performance stages or halls, as well as related settings such as lighting, sounds, and fog, amongst others.

The processing unit within the cloud server (e.g. processing unit 122 and cloud server 126 of FIG. 1) may create interactive volumes on each of the interaction elements 202, enabling remote viewers to passively or actively manipulate each of the interaction elements 202. These interactive reality volumes may be created by distance interpolation methods applied on the interaction elements 202 to calculate the height and shape of each of the elements. However, other techniques known in the art may be used in order to create interactive reality volumes. Additionally, a content database within the cloud server may contain information of the various interaction elements 202. For example, the content databases may include statistics, biographies, etc., of people 210; specific details of objects 212 located within the live event, if available; and live event stage 214 highlights, features, dimensions, history, capacity, and the like.

The interactive reality volumes and content databases may enable passive and active manipulation modes 204 between remote viewers and immersive content such that remote viewers may provide various types of feedback to a processing unit including instructions to whether or not update the live event. Generally, feedback enabled by manipulation modes 204 include video data, audio data, textual data, haptic data, or a combination thereof, as enabled by the interaction devices, the type of event, and feedback options for remote viewers. Passive manipulation 216 may involve providing feedback to a processing unit (e.g., processing unit 122 of FIG. 1) in a way that the feedback data and instructions trigger the processing unit to update the rendered immersive content as viewed by individual or group remote viewers. For example, passive manipulation 216 may include modifying views (e.g., zooming in and out, panning, rotating views, moving around within the live event stage 214, etc.), requesting further information from the interaction elements 202 as provided by the content database, and other actions which may only modify the view for remote viewers without necessarily affecting the live event for other viewers. Active manipulation 218 may involve providing feedback to the processing unit in a way that the feedback data includes instructions to update the live event as well as the rendered immersive content, which can have an effect on the immersive content for other viewers as well. For example, active manipulation 218 may include modifying settings of the live event stage 214, such as lighting intensity or colors, sounds, fog, and the like. However, active manipulation 218 may as well include inserting elements into the live event stage 214, such as inserting text data, image data, video data, or other forms of data that may deliver a message to be displayed within the interactive environment hosting the live event, such as submitting an opinion or actively affecting the course of a live event through a vote or other means.

Remote viewers may view and interact with the various interaction elements 202 through different interaction views 206, including viewer virtual teleportation to live event 220 and virtual projection of live event 222. Viewer virtual teleportation to live event 220 includes simulating an experience for remote viewers in a way that the remote viewers may feel present at the live event. For example, in the case of a soccer (referred to herein as "football") match, users may be view the football match as if they were sitting in a selected place in the football stadium hosting the match while, in real life, the remote viewers may be sitting at any preferred location (e.g., home, a bar, a park, etc.). Virtual projection of live event 222 includes virtually bringing certain interaction elements 202 of the live event to the remote viewers 104 viewing the live event such that the interaction elements 202 may overlap real-life elements surrounding the remote viewers 104. For example, making reference to the football match above, players, referees, soccer balls, and other elements of the football match may be mapped against an empty football pitch in a stadium where the remote viewers may be located, giving the remote viewers the sensation of being present in a remote stadium where the real soccer match takes place.

Based on the live event, the type of feedback received from remote viewers, the available set of actions for the remote viewers, and the presentation capabilities of the interactive environment hosting the live event, interaction elements 202 of the live event may be actively manipulated and updated based individual feedback 224 and group feedback 226. In the case of individual feedback 224, the processing unit may update the live event based on the feedback received from one or more selected individual remote viewers. For the case of group feedback 226, the processing unit may update the live event by gathering and calculating a predominant feedback through statistical methods and then updating the event accordingly. Group feedback 226 may be based on feedback gathered from the totality of remote viewers watching a live event, or from selected groups of remote viewers. The individual remote viewers or selected groups of remote viewers may be selected randomly or by using other methods, such as based on special permissions or security entitlements that users may access through a subscription fee or other methods.

Figure 3A:
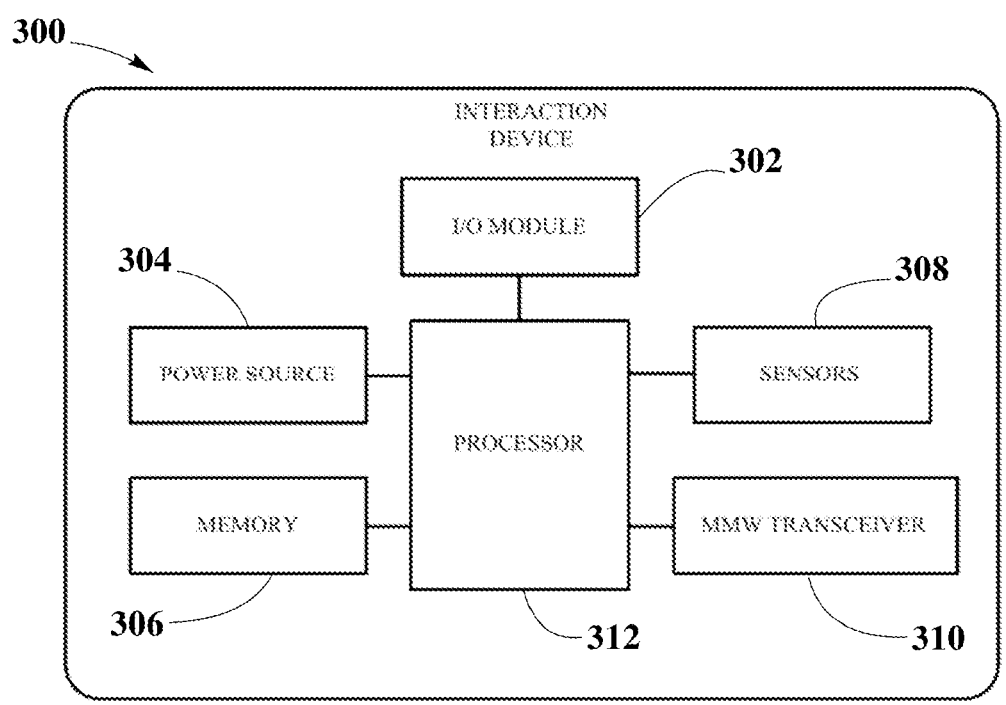
FIGS. 3A-3B show schematic representations of an interaction device, according to an embodiment of the present invention.
Figure 3B:
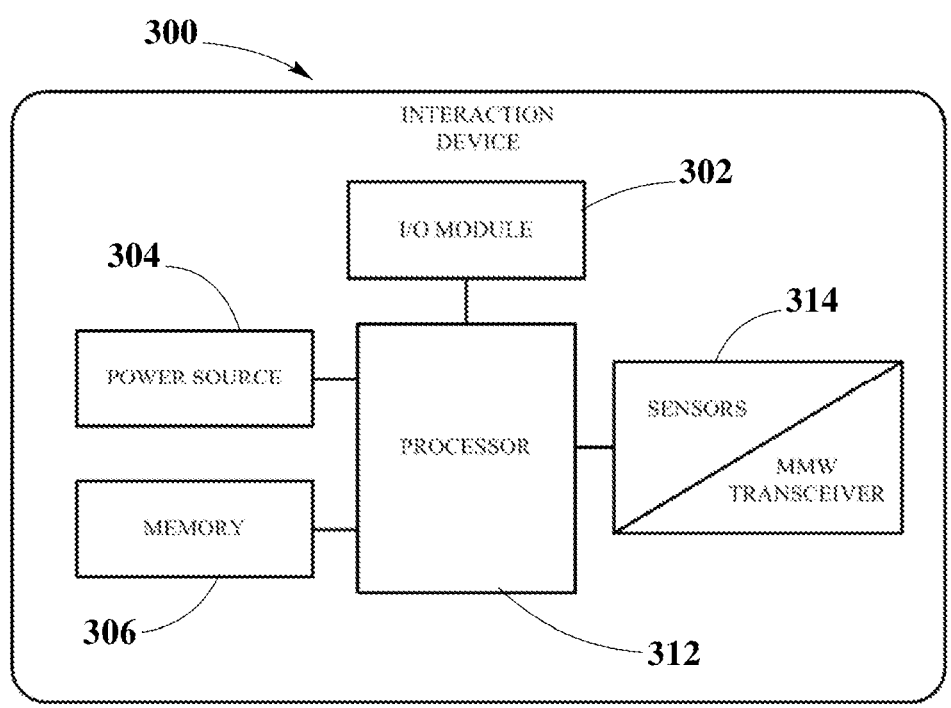

FIGS. 3A-3B each shows a schematic representation of an interaction device 300 according to an embodiment of the present invention.

In some embodiments, the interaction device 300 is implemented as a computing device including hardware and/or software configured to receive consumable media data and present content to remote viewers in the form of immersive content. As a non-limiting example, and with specific reference to FIG. 1, the interaction devices 300 may receive, via network 112, the immersive content 106 from processing unit 122 implemented in cloud server 126, and may send, via network 112, feedback 120 to processing unit 122 implemented in cloud server 126.

FIG. 3A shows an embodiment whereby the interaction device 300 includes system components such as an input/output (I/O) module 302, a power source 304, a memory 306, sensors 308, and a mmW transceiver 310, all operatively connected to a processing unit 312.

The I/O module 302 is implemented as computing hardware and software configured to interact with remote viewers and provide user input data to one or more other system components. For example, I/O module 302 may be configured to interact with remote viewers 104, generate user input data based on the interaction, and provide the user input data to the processing unit 312 of the interaction device 300 before being transferred to other processing systems, such as processing unit 122 of FIG. 1. In another non-limiting example, one or more I/O module 302 is implemented as an external computing pointing device (e.g., a touch screen, mouse, 3D control, joystick, gamepad, and the like) and/or text entry device (e.g., a keyboard, dictation tool, and the like) configured to interact with immersive reality devices 300. In yet other embodiments, I/O module 302 may provide additional, fewer, or different functionality to that described above.

The power source 304 is implemented as computing hardware configured to provide power to the interaction devices 300. In one embodiment of the invention, the power source 304 may be a battery. The power source 304 may be built into the interaction devices 300 or removable from the interaction devices 300, and may be rechargeable or non-rechargeable. In one embodiment, the interaction devices 300 may be repowered by replacing one power source 304 with another power source 304. In another embodiment, the power source 304 may be recharged by a cable attached to a charging source, such as a universal serial bus ("USB") FireWire, Ethernet, Thunderbolt, or headphone cable, attached to a personal computer. In yet another embodiment, the power source 304 may be recharged by inductive charging, wherein an electromagnetic field is used to transfer energy from an inductive charger to the power source 304 when the two are brought in close proximity, but need not be plugged into one another via a cable. In another embodiment, a docking station may be used to facilitate charging.

The memory 306 may be implemented as computing software and hardware adapted to store application program instructions and to store telemetry metadata of the interaction devices 300 from the sensors 308.

The sensors 308 may be implemented as computing software and hardware adapted to obtain various telemetry metadata from users. The sensors 308 may include, for example, one or more of an Inertia Measuring Unit (IMU), accelerometers, and gyroscopes, amongst others. The IMU is configured to measure and report the velocity, acceleration, angular momentum, speed of translation, speed of rotation, and other telemetry metadata of the interaction device by using a combination of accelerometers and gyroscopes. Accelerometers within the IMU may be configured to measure the acceleration of the interaction device, including the acceleration due to the Earth's gravitational field. In one embodiment, accelerometers within the IMU may include a tri-axial accelerometer that is capable of measuring acceleration in three orthogonal directions. In other embodiments one, two, three, or more separate accelerometers may be included within the IMU. In other embodiments, additional accelerometers and gyroscopes may be included separate from the IMU.

The mmW transceivers 310 may be implemented as computing software and hardware configured to enable the interaction device 300 to receive mmW wave signals from the antennas and to send the data back to antennas when interacting with immersive content. The mmW transceiver 310 may be a two-way communication mmW transceiver 310.

In an embodiment of the present invention, combining the capabilities of the sensors 308 (i.e. IMU, accelerometers, and gyroscopes) with the positional tracking provided by the mmW transceivers 310 and the accurate tracking, low-latency and high QOS functionalities provided by the mmW-based antennas of the current invention may enable sub-centimeter or sub-millimeter positional and orientational tracking, which may increase accuracy when tracking the real-time position and orientation of the interaction devices and may improve the general user experience when interacting with immersive content.

Tracking of the interaction device 300 may be performed employing several techniques known in the art. For example, tracking may be performed by employing time of arrival (TOA) tracking technique, which uses information gathered from three or more antennas. The interaction device 300 then sends out a signal that is received by all of the antennas within range. Then, each antenna measures the amount of time it has taken to receive the signal from the time the signal was sent, triangulating the position of the interaction device 300. In other embodiments, tracking of interaction devices may be performed by using an angle of arrival (AOA) technique which, instead of using the time it takes for a signal to reach three base stations like TOA does, uses the angle at which an interaction device signal arrives at the antennas. By comparing the angle-of-arrival data among multiple antennas (at least three), the relative location of an interaction device can be triangulated. In further embodiments, other tracking techniques known in the art may be employed (e.g., visual imaging, radar technology, etc.).

The processing unit 312 may be implemented as computing hardware and software configured to receive user input data, provide imaging requests, receive imaging data, process imaging data into environment or other data, process user input data and/or imaging data to generate user interaction data, provide server requests, receive server responses, and/or provide user interaction data, environment data, and content object data to one or more other system components. For example, the processing unit 312 may receive user input data from I/O module 302 and may respectively implement application programs stored in the memory 306 of the interaction device 300. In other examples, the processing unit 312 may receive location, position, or other telemetry metadata from sensors 308 (e.g., information about a user's hand movements, controller manipulation, traveling trajectory, etc.) from mmW transceiver 310, or from combinations thereof. The processing unit 312 may also be capable of implementing analog or digital signal processing algorithms such as raw data reduction or filtering.

FIG. 3B shows an embodiment whereby the interaction device 300 includes an I/O module 302, power source 304, a memory 306, and a coupled sensor/mmW transceiver 314, all operatively connected to a processing unit 312. The functionality of the various components of the interaction device 300 are described above herein with respect to the description of FIG. 3A.

In other embodiments, one or more components of interaction device 300 may be omitted, or one or more additional components may be added.

Figure 4:
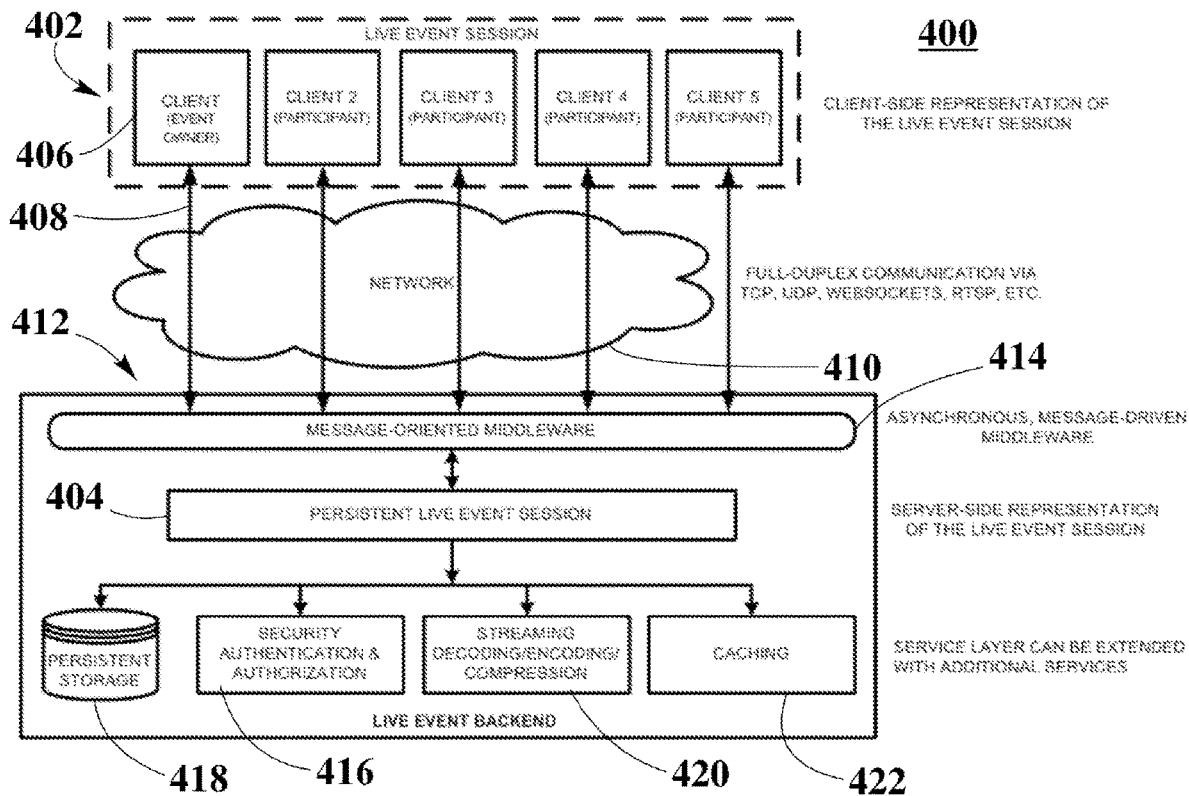
FIG. 4 shows a schematic illustration of a system detailing the organization of a live event session, according to an embodiment of the present invention.

FIG. 4 shows a schematic illustration of a system detailing a live event session organization 400, according to an embodiment of the present invention. A live event may be represented by a transient live event session 402 on a client side as well as a persistent live event session 404 on a server side of the system. A client 406, such as "Client 1", which may be a remote viewer of a remote audience, may create the live event. The client 406 may therefore be denoted as an owner of the live event. The owner of the live event may have special features and permissions with regard to interaction and participation with the live event based on the type of the live event. The remote audience may furthermore include additional clients, such as "Client 2" to "Client 5", that may participate and interact with the live event. However, it is to be understood that the present disclosure is not restricted to a remote audience of a particular size and number. Rather, the number of remote viewers and clients is not restricted and may only be limited by available processing resources of the system. Also, the creator and owner of a live event need not be part of the remote audience.

The client 406 may, for example, provide feedback via a feedback channel 408 within a network 410 to a live event backend 412 of the system. As a non-limiting example, and with specific reference to FIG. 2, the client 406 may provide feedback in the form of passive manipulation 216 or active manipulation 218 of interaction elements 202, including video data, audio data, textual data, haptic data, or combinations thereof. The feedback data may first be handled by a message-oriented middleware 414, where it may be provided to the subsequent layers of the system for authorization via a security component 416, storage via a persistent storage 418, streaming by a streaming component 420, and caching by a caching device 422. Yet, it is to be understood that client 406 may also upload the feedback data in order to create a new live event to which the other clients may connect. For example, in the case of a video feedback data, the video may, for example, be streamed in an interactive environment, which is recorded and provided to remote viewers. Based on the recording, the connected clients may provide feedback on the video and the feedback may be directly displayed within the interactive environment. Thus, the feedback will be preferably immediately visible to the other clients observing the live event.

Further clients participating in the live event via the network 410 or another network (not shown) that may also be connected to the live event backend 412 of the system may preferably be connected as single entities to the message-oriented middleware 414 that organizes these clients in an asynchronous way. The message-oriented middleware 414 handles all further communication of the clients with the live event through the persistent live event session 404 and also any streaming towards the clients. The requests of the clients to participate in a live event are preferably processed in the same manner. For example, the security component 416 may authorize access of a client to a live event, and the persistent storage 418 may be instructed to fetch requested data, such as a recording of the live event, which may further be cached in the caching device 422. In the case that a request is not cached and immediately ready for the audience, the system may fetch necessary data from the persistent storage 418 directly and stream the data towards the client via the streaming component 420. Furthermore, any interaction of the clients with the live event may also be handled in the same way. For example, and referring to active manipulation 218 of FIG. 2, feedback is transferred through one of the feedback channels 408 via the network 410 or an additional network, processed by the live event backend 412, causing the live event to immediately and directly update. In another non-limiting example, referring to passive manipulation 216 of FIG. 2, feedback that is transferred through one of the feedback channels 408 via the network 410 or an additional network may as well include instructions prompting the live event backend 412 to cause only the current view of the one or more users to be updated without updating the live event. Further, in this example of passive manipulation, and making reference to FIG. 2, feedback including data requests on one or more interaction elements 202 of the live event, may be transferred to the persistent storage 418 for retrieving desired details on each of the one or more interaction elements 202. The results may be streamed by the streaming component 420 towards the connected remote clients, for example, via a live recording of the live event. The streaming component 420 may compress and encode the results. In addition, the streaming component 420 may encode the results based on data from authentication and authorization of the client provided by the security component 416.

The network 410 preferably enables a full-duplex communication, for example, via TCP, UDP, WebSockets, RTSP, and others. For example, the network 410 may be the Internet.

However, it is to be understood that the present disclosure is not limited to a certain type, topology, or configuration of a network. Furthermore, the persistent storage 418 may be any type of suitable storage, such as a memory unit, a local, remote, or distributed database or another kind of storage device capable of storing live event related data in a persistent way. Also, the security component 416 may allow for authentication and authorization of remote viewers, such as the clients, using any suitable authentication and authorization mechanism. Furthermore, it is to be understood that the service layers of the live event backend 412 may be extended with additional services, for example, services related to accounting and advertisement booking, to name some.

Figure 5:
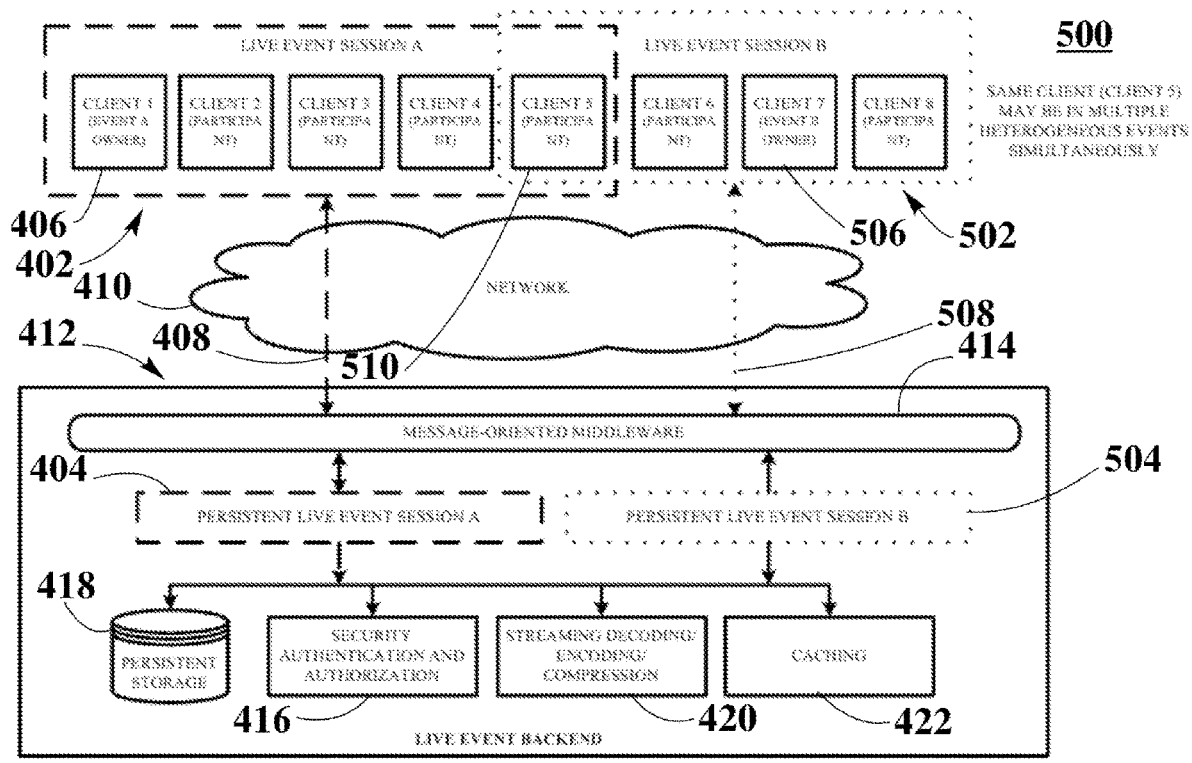
FIG. 5 shows a schematic illustration of a system detailing the organization of a plurality of live event sessions, according to an embodiment of the present invention.

FIG. 5 shows a schematic illustration of a multiple-live event session organization 500 according to an embodiment of the present invention, similar to the system of FIG. 4.

Therefore, features in FIG. 5 similar to features of FIG. 4 are denoted by the same numerals. However, it may be understood that new features in FIG. 5 are denoted by different numerals. In addition to the system of FIG. 4, FIG. 5 also details a management and organization of a plurality of live event sessions, which relate to live events that may happen independently of each other. The system may handle multiple live event sessions separately, whenever multiple live events are happening at the same time or at overlapping times.

For example, a first live event A may be represented as a transient live event session A at a client side, such as the transient live event session 402, and as a persistent live event session A at a server side, such as the persistent live event session 404. The corresponding live event A may be initiated, created, and owned by a remote viewer, and a group of further remote viewers, such as "Client 2" to "Client 5", may interact and participate with the live event A via feedback channels 408 provided via a network 410.

In addition, the system may host a second live event B, which is represented as a transient live event session 502 on a client side B, and a persistent live event session 504 on a server side B. The transient live event session 502 may define an owner of the live event B, such as remote viewer 506, as well as a group of further remote viewers participating and interacting with the live event B. For example, remote viewer 506, denoted as "Client 7", and further remote viewer, such as "Client 5", "Client 6", and "Client 8", may interact and participate in the live event B via feedback channels 508, which may also be provided via the network 410. However, it is to be understood that for interaction with live event B also, a different network may be used. Also, some of the remote viewers may use network 410 and other remote viewers may use a different network in order to participate in live event B.

As shown in FIG. 5, the groups of remote viewers related to live event A and live event B, respectively, need not be disjointed and may comprise overlapping clients. For example, remote viewer 510, represented as "Client 5", may participate in both live event A and live event B. Therefore, some remote viewers 510 may be able to participate in more than one live event. In this case, the message-oriented middleware 414 filters all requests and feedback of the remote viewers 510 towards the correct live event session so that the data is stored and processed in connection to the respective live event session. However, beside the message-oriented middleware 414, the system may also use the services provided by the security component 416, the persistent storage 418, the streaming component 420, and the caching device 422, to name a few non-limiting examples, in order to process feedback and requests for both live event session A and live event session B. The use of one message-oriented middleware 414 and services 416, 418, 420, 422 for a plurality of live events being observed by a possibly overlapping group of remote viewers, greatly simplifies the organization and management of the live events and enables a flexible and direct participation and interaction with the live events.

According to a non-limiting, exemplary embodiment of the present invention, and referring to active manipulation of interaction elements, a remote audience may watch a live event, such as a football match, which may be broadcasted or streamed, either locally or through the Internet, to respective devices, such as an interactive TV set, a computer, a mobile device (e.g., a tablet device or mobile phone), and, preferably, immersive reality devices such as head-mounted or see-through devices. Each remote viewer may use an application running on the device in order to send feedback to a provider of the live event via a system according to an embodiment of the present invention. For example, a remote viewer may decide about a preferred team. The remote viewer may thereafter use and/or press one of a plurality of buttons or via NUI gestures indicating options for the respective feedback, such as two buttons or options indicating "cheering" and "booing", respectively. After selection, the feedback may be transferred back to the organizer via the system. A remote viewer may repeat the feedback procedure anytime while the football match is running. The collected feedback data of all remote viewers and possibly local viewers connected to the system are processed, for example, in a processing unit such as the processing unit 122 of FIG. 1, and the processed feedback may be presented, for example, on a score board in the stadium hosting the football match. In particular, the score board may show animated icons of fan groups cheering or booing, depending on a majority or average value derived from feedback of remote viewers associated with one of the teams playing the match.

In certain moments of the live event, such as during scoring a goal, the remote viewers may provide a feedback which may comment on the action or occurrence, for example, by pressing buttons on their input devices or via NUI gestures indicating a certain meaning, such as "I like/I agree" and "I don't like/I disagree", respectively. These feedback data may preferably be collected for a certain time frame and may thereafter be presented as a poll on the stadium score board. Thus, the remote audience at home as well as the local audience at the live event are both able to watch the presented processed feedback.

Preferably, advanced feedback capabilities could include sending text messages, which may be displayed on the scoreboard or as perimeter advertising on further display devices. Also, such processing could include sending sounds and other media data to an audio system or a multimedia system within the stadium.

In another non-limiting, exemplary embodiment of the present invention, and making reference to the football match live event described above, remote viewers viewing a football match may be able to click or touch interaction elements of the live event when holding or wearing a suitable device, enabling them to interact with the interaction elements. For example, users may view in real-time, from home or any other preferred remote location, action taking place in the football stadium as if they were present at the football stadium. Once remote viewers have, via a suitable device or NUI gesture, selected an interaction element, the remote viewers may proceed to manipulate the specific interaction element, such as a player, a football, or a football pitch. Further, in this example, and referring to active manipulation of interaction elements, all remote viewers, and preferably remote viewers who have been entitled with special permissions, may be able to actively manipulate certain interaction elements such as lighting inside of the football stadium by virtually touching the lights at the stadium or through other methods. The remote viewers may then adjust the lighting at the stadium. Feedback data for adjusting the lighting may be collected from all permissible remote viewers and possibly local viewers connected to the system and may be thereafter processed. Lighting may be thereafter adjusted depending on a lighting setting selected by a majority of viewers.

Further, in an example of a football match live event, the remote viewers may further be able to, through passive manipulation, access details of one or more of interaction elements, such as player statistics or biography, football speed, acceleration, trajectory, etc., and stadium details such as history, dimensions, capacity, etc. The information can be processed, rendered, and transmitted back to remote viewers without updating the live event. For embodiments requiring telemetry metadata from, for example, a football, suitable system components may need to be connected to the football in order to measure respective telemetry metadata, preferably one or more system components described in FIG. 3 functioning according to embodiments of the current invention. In a further example employing passive manipulation, remote viewers and, possibly local viewers, may be able to request a replay of a specific play that has recently taken place at the football match.

Furthermore, game-like actions could be initiated by the remote as well as by the local audience through the system. For example, whenever a certain number of remote and local viewers execute the same action, a multimedia animation or reaction may be shown on display devices in the interactive environment hosting the live event, such as the scoreboard within the stadium. If the participating audience manages to execute a certain number of reactions, for example, three of these reactions, the audience may be rewarded with a "bonus" like a sound or other multimedia content being played in the stadium.

In yet another non-limiting exemplary embodiment of a system according to the present invention, the spectators of a theatre performance may be allowed to directly participate in the performance. The system could be used to connect a local audience that is directly present in an interactive environment, such as a theatre hall or a TV show studio, with a remote audience watching a recording of the performance at home using suitable devices. Thus, the system allows for a much bigger group of spectators to participate in the live event. For example, the performed piece or show may include a courtroom trial. While the actors play several roles, such as a judge, lawyers, and suspects, the remote and local audience may act as a jury and may vote. While most of the show may not require any direct participation, the audience will stay engaged since they know that they will have to provide feedback and therefore should pay attention. In addition to feedback related to the final vote, the viewers may also be required to provide feedback influencing the progression of the trial. Furthermore, the audience may also directly control stage effects, like lights, fog, or sounds.

According to another embodiment of a system according to the present invention, a TV station may broadcast a trivia game show where participants can win money by answering questions. Remote viewers of the show may directly participate by sending a suggestion on the right answer as feedback to the player in the case a player does not know an answer. The player may consider the feedback and may communicate with the remote viewer, for example, by directly speaking to any means for recording the live event, such as TV cameras, and receiving further feedback from the remote audience until the player is sure he has received the right answer. The player and/or the interactive environment hosting the game show may also provide one of the remote viewers providing the initial guess on the right answer with enhanced access rights, such that any subsequent feedback of that remote viewer is handled with a certain preference and directly supplied to the player.

Another level of direct participation and interaction according to an embodiment of the present invention may include involving the remote viewers as actual players directly participating at the game show. Either one, some, or all remote viewers may be enabled to participate as players and answer questions in order to win the game show, resulting in a mixed group of players playing the game together (or against each other) being locally and/or remotely present at the game show's location.

In yet another non-limiting, exemplary embodiment of the present invention, an interactive environment hosting a game show may feature a dexterity-based challenge, like riding on a rodeo bull machine or maneuvering a boat through a simulated wild water river or within another computer-generated or simulated virtual environment. While some participants may be present at the location of the show, other participants may also be connected remotely and take part via the system according to an embodiment of the present invention. The participants could team up to support each other through different feedback channels. For example, the local participants may actually directly interact with the challenge by interacting with an input device of the dexterity-based challenge, such as sitting on the rodeo bull machine trying to balance on top of it, while the remote participants may either support the local participants by decreasing the force that the rodeo bull machine is moving around, or play against the local participants by increasing the force in order to push any local participant off the rodeo bull machine.

In yet another non-limiting, exemplary embodiment of the present invention, an interactive environment hosting a board meeting may include a number of local participants located in a meeting room, and a number of remote viewers participating from other locations. The remote viewers may remotely attend the board meeting being virtually transported (e.g., being able to view all elements of board meeting via, preferably, an immersive reality device) to the meeting room. Alternatively, local participants of the board meeting as well as other interaction elements of the board meeting may be mapped against the space or elements around the remote viewer, virtually projecting the remote board meeting to the one or more remote viewers. The remote viewers may actively participate in the board meeting by providing audio, video, or other types of feedback to the remote board meeting, which may be processed through a suitable processing unit and rendered by a suitable renderer, such as a processing unit 122 and renderer 118 of FIG. 1.

In yet another non-limiting, exemplary embodiment of the present invention, an interactive environment may include a real-life auction whereby a number of local participants located in an indoor or outdoor auction room, and a number of remote viewers are participating from other locations. The one or more remote viewers may provide feedback by inputting, via suitable devices, bids to the auctioned goods. The bids feedback from remote viewers may be processed by a suitable processing unit, such as a processing unit 122 of FIG. 1, and shown to local participants of the auction. In similar exemplary embodiments, whereby the system of the current invention is employed in an auction, a live digital auction may be held in a website or web application. In this exemplary embodiment, computer-generated images representing the setting of an auction may be rendered by a renderer, such as a renderer 118 of FIG. 1, and presented to viewers. Moreover, each participant may be assigned a virtual avatar which may or may not represent the real appearance of each participant. This way, participants may virtually meet and participate in the auction.

The same principles described in the examples above may be applied to other types of situations, such as e-shopping. For instance, taking an example of e-shopping, each buyer may be assigned a three-dimensional avatar and may meet other buyers and sellers of an online store displaying different goods. Remote viewers may be virtually transported to the virtual e-shop or the virtual e-shop may be projected to the remote viewers. The remote viewers may buy and sell goods and may perform payments or other transactions. The remote viewers may as well communicate to each other. For example, a remote buyer may, after viewing the tree-dimensional avatar of seller, ask more details about a product including dimensions, characteristics, price discounts, etc. Likewise, buyers may communicate to each other and discuss buying possibilities. In some embodiments of the invention, sellers may include a "bot", or automated agent, which may act as a human virtual seller, and may help buyers on their buying experience without human intervention.

Employing the principles of the above examples for the additional example of crowdfunding activities, viewers may select from a number of crowdfunding projects, each of which may include its own virtual interaction elements. Viewers may equally meet at these crowdfunding interactive environments, each representing a crowdfunding project, and may donate to the preferred project. The system disclosed herein as one or more embodiments of the present invention may moreover enable communication between each remote viewer, such that viewers may, for example, send audio or video feedback to each other in order to discuss and evaluate the different crowdfunding projects.

According to a further non-limiting example, an interactive environment may comprise a surgery room including a volumetrically scanned operation chair. The surgery room along with all actors, virtualized objects, user avatars, and virtualized operation chair, as well as the activities taking place in the surgery room, would be made visible to virtual participants. As such, the real participants of the real surgery room can interact with the virtual participants to perform the operation. For example, an experienced doctor can remotely provide live guidance to a surgeon and medical staff during a surgery. The remote participant may even drive naturally a real surgical machine, through the virtual twin of such surgical machine. In order to allow a live manipulation of a real object via a virtual replica, techniques can be applied as described in U.S. Provisional Application No. 62/676,124, filed on May 24, 2018.

According to a further non-limiting, exemplary embodiment of the system according to the present invention, a digital game tournament may be broadcasted via TV, video game consoles, an Internet site, or similar devices to a broad remote audience watching the live event. The remote audience may be capable of sending feedback to a processing unit in a cloud server. The processing unit may process the feedback data in order to enable participation of the remote viewer at the live event. As discussed above with regard to other exemplary embodiments, a remote viewer may participate by commenting and/or cheering with regard to a certain occasion or action during the live event, or may directly influence the actual digital game tournament.

For example, during the live event a certain number of players may be organized in several teams, each playing a digital game, such as a first-person shooter game. While teams may directly compete against each other, the whole remote audience may be able to influence the digital game in different ways, such as by (1) cheering for one of the teams and thus showing a respective support; (2) supporting one of the teams by delivering resources for the digital game, e.g., new equipment, weapons, bonuses, or the like; (3) adding neutral events to the game like starting an earthquake, changing the weather, adding a third hostile force controlled by artificial intelligence, etc.; and (4) adding other events to the progress of the digital game that are not controlled by the competing teams, or other possible interactions. The remote audience may watch the progress of the team match on one or more screens or views, as well as the actions invoked by the remote audience. The latter may be watched either on the same displays or screens or on separate displays or screens, such as a fan view that provides a view not only of the action of the live event but also of the local audience.

According to another non-limiting, exemplary embodiment of a system according to the present invention, users of a mobile input device, head-mounted display, or see-through device, may connect, for example, to the Internet to join together in a gaming environment and jointly control the behavior of virtual objects of a digital game, such as steering a vehicle, by providing feedback data to the system. The interactive environment hosting the game may provide a media stream, for example, video, audio and/or other media, related to the game, which is transferred to all remote participants. The media stream or recording of the interactive environment may comprise any content related to the live event, such as a pre-rendered or rendered video stream of the game broadcasted to all remote participants or an abstract representation of the game environment, for example, data related to a scene graph or updates to the scene graph, which may be transferred to the devices of each remote participant and rendered on the respective device.

Each remote participant may send feedback related to a desired control of a virtual object of the game, such as the vehicle. The system may collect and process the feedback of all remote viewers and invoke a corresponding action within the interactive gaming environment based on the processed results. For example, the digital game may require steering a vehicle through an enjoyable environment and collecting bonus items while avoiding obstacles. The remote viewers may see via the recording of the interactive environment data about other remote viewers steering the vehicle and data about how many other remote viewers are connected to the interactive environment, as well as other information to increase the involvement and presence of the remote audience in the interactive environment hosting the live event. This approach advantageously allows for participation of remote viewers, which may be located anywhere. In particular, the remote viewers need not be, but may be, at the same location. The only requirement to connect to the system according to an embodiment of the present invention is an interaction device, for example, a mobile phone, an immersive reality device such as a head-mounted display or see-through device, or a non-portable device, such as a set-top box or a personal computer, enabling a user to watch the recording of interactive environment hosting the live event as well as to connect to the system to provide feedback in order to directly influence the interactive environment.

Even though the present invention has been described by means of exemplary embodiments, it is to be understood that the present disclosure is not limited to a particular live event as well as related processing and mode of participation and interaction, such as watching a sports event, interacting with a theatre performance or show, participating in a television or game show, participating in a board meeting, participating in an auction, performing e-commerce and live shopping, and/or being involved in a digital game tournament or an online crowd game. Rather, any live event which may be recorded or created by a computer system and transmitted to a remote audience may be hosted by a system according to an embodiment of the present invention, enabling the remote audience to directly participate and influence the live event.

Figure 6:
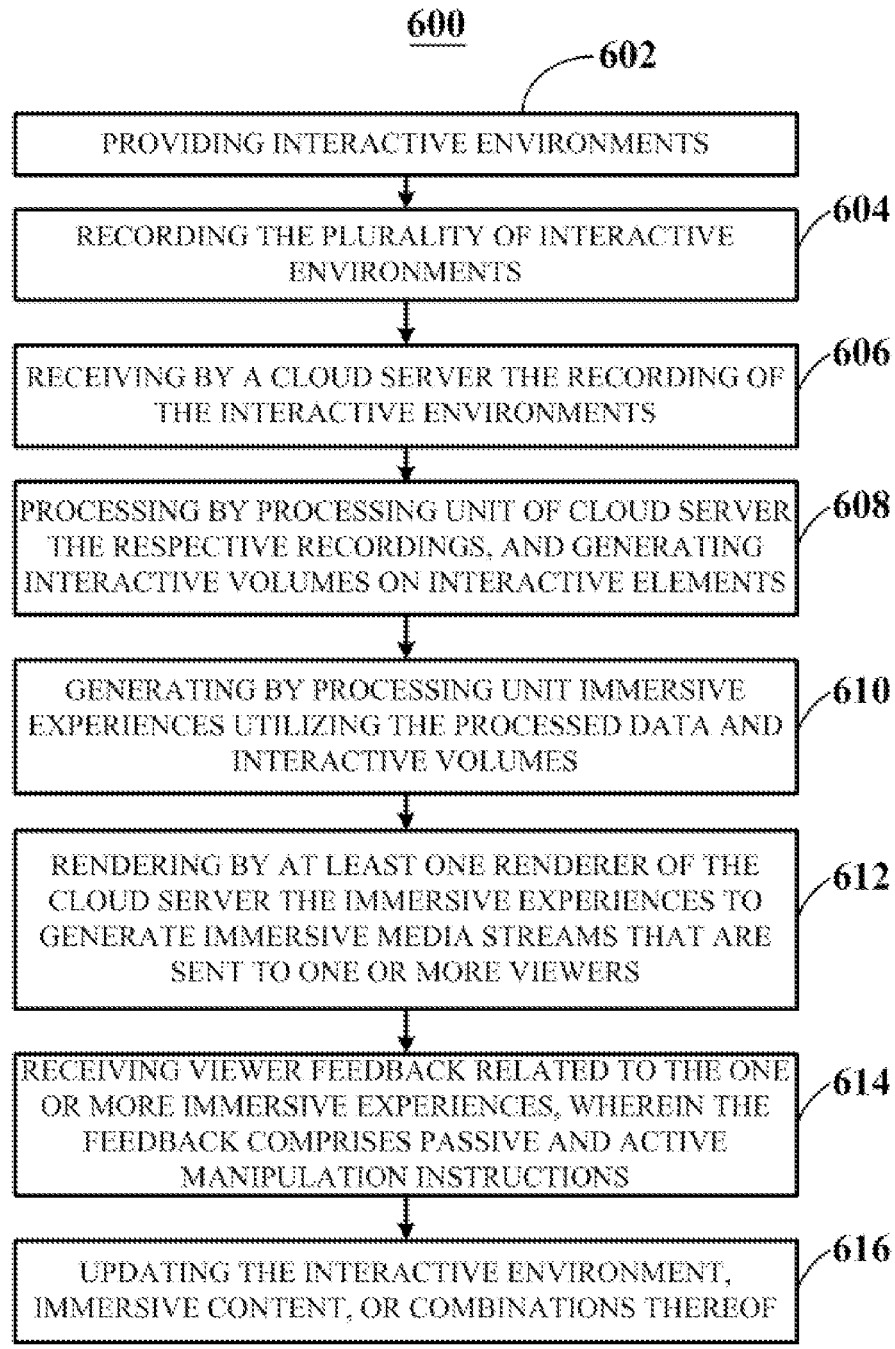
FIG. 6 shows a flow chart of a method, according to an embodiment of the present invention.

FIG. 6 shows a flow chart of a method 600 according to an embodiment of the present invention. The method 600 may, for example, be executed by a system according to an embodiment of the present invention, such as the systems discussed with regard to FIGS. 1-5 and may include immersive interaction features disclosed in FIG. 2.

At block 602, the method provides one or more interactive environments, wherein each interactive environment hosts a live event. Each of the interactive environments is continuously recorded or virtually generated at block 604. At block 606, the method 600 continues by receiving by a cloud server the recording of the interactive environments, wherein the cloud server includes one or more remote servers comprising at least a processing unit, memory and at least one renderer. In block 608, the method 600 continues by processing, by the at least one processing unit of the cloud server, the respective recording of one or more of the plurality of interactive environments and generating interactive volumes on interactive elements. Then, in block 610, the method 600 continues by generating by the at least one processing unit, immersive experiences utilizing the processed data and interactive volumes on interactive elements. Thereafter, the method 600 proceeds in block 612 by rendering, by the at least one renderer, the immersive experiences to generate immersive media streams that are sent to the one or more viewers via interaction devices. Subsequently, in block 614, the method continues by receiving viewer feedback related to one or more of the immersive experiences linked to the live events, wherein the feedback comprises passive manipulation and active manipulation instructions, the passive manipulation instructions prompting the processing unit to only update the immersive content sent to the interaction devices, and the active manipulation instructions prompting the processing unit to update the live event along with the immersive content. Finally, the method ends in block 616 by updating, by the at least one processing unit and renderer, the interactive environment by initiating an action within the interactive environment, or updating the immersive content on the processed feedback, or combinations thereof. Determining whether to update the live event and/or only the immersive content may depend on whether the received feedback includes active or passive manipulation of interaction elements (e.g., passive manipulation 216, active manipulation 218, and interaction elements 202 of FIG. 2).

While specific preferred embodiments of the invention have been illustrated and described, it will be clear that the invention is not so limited. Numerous modifications or alterations, changes, variations, substitutions and equivalents will occur to those skilled in the art without deviating from the spirit and scope of the invention, and are deemed part and parcel of the invention disclosed herein.

Further, the invention should be considered as comprising all possible combinations of every feature described in the instant specification, appended claims, and/or drawing figures which may be considered new, inventive and industrially applicable.

Multiple variations and modifications are possible in the embodiments of the invention described here. Although certain illustrative embodiments of the invention have been shown and described here, a wide range of modifications, changes and substitutions is contemplated in the foregoing disclosure. While the above description contains many specifics, these should not be construed as limitations on the scope of the invention, but rather as exemplifications of one or another preferred embodiment thereof. In some instances, some features of the present invention may be employed without a corresponding use of the other features.

Accordingly, it is appropriate that the foregoing description be construed broadly and understood as being given by way of illustration and example only, the spirit and scope of the invention being limited only by the claims which ultimately issue.

The invention claimed is:

1. A system for remote participation in live events, comprising:
   a plurality of interactive environments, each hosting a live event and each comprising recording equipment configured to record the interactive environment;
   one or more transmitters coupled to each of the plurality of interactive environments, wherein the one or more transmitters is configured to receive the respective recording from each interactive environment and to transfer the respective recording to at least some remote viewers of the live event;
   a cloud server with one or more remote servers comprising at least a processing unit, memory, and at least one renderer, the processing unit comprising computing resources sufficient to process the respective recording, to generate interactive volumes on one or more interactive elements, thereby enabling the at least some remote viewers to passively or actively manipulate the one or more interactive elements, to generate immersive experiences for the at least some remote viewers by utilizing, at least in part, the interactive volumes, and to process viewer feedback related to the immersive experiences, and the renderer comprising computing resources sufficient to render image data from the immersive experiences to generate immersive media streams that are sent to the at least some remote viewers, wherein the memory of the server stores a persistent virtual world system comprising at least one virtual replica of a corresponding real object, wherein the virtual 3D world coordinates and virtual properties of the virtual replicas are based on the 3D world coordinates and properties of the real objects, and wherein the plurality of interactive live environments is continuously updated in the persistent virtual world system; and
   one or more interaction devices configured to receive the immersive media streams comprising the immersive experiences and to input the viewer feedback relating to the immersive experiences to the cloud server; wherein the viewer feedback comprises passive manipulation and/or active manipulation instructions, the passive manipulation instructions prompting the processing unit to manipulate one or more viewing aspects of the live event for one or more viewers in the at least some remote viewers without affecting the live event, and the active manipulation instructions prompting the processing unit to manipulate one or more aspects of the live event,
   wherein the immersive experiences are linked to the live event.

2. The system of claim 1, wherein the processing unit comprises a middleware module configured to asynchronously organize the communication between the processing unit and the plurality of remote viewers, wherein the middleware module is configured to expose a plurality of network connections for receiving the feedback of the remote viewers and transferring data processed by the cloud server to the determined interactive environment of the plurality of interactive environments, wherein the middleware module is further configured to filter all requests and feedback of one remote viewer, in the plurality of remote viewers, that is participating in more than one live event towards a correct live event session so that data is stored and processed in connection to a respective live event session.

3. The system of claim 1, further comprising one or more feedback channels to couple at least some of the remote viewers to the cloud server, each feedback channel associated with one interactive environment.

4. The system of claim 1, further comprising one or more transfer channels, each transfer channel associated with one interactive environment, wherein the cloud server is configured to transfer the recording of an interactive environment to at least some of the remote viewers via the associated transfer channels.

5. The system of claim 1, wherein the equipment configured to record the interactive event comprises one or more Light Detection and Ranging (LIDAR) devices configured to provide precise distance and depth information of the live event to the renderer.

6. The system of claim 1, wherein the interactive volumes comprise interactive reality volumes created by distance interpolation methods applied on the one or more interactive elements to calculate height and shape of each of the one or more interactive elements.

7. The system of claim 1, wherein the interactive environment is a computer-generated environment or an event including real-life elements combined with computer-generated elements, including at least one of a concurrently or synchronously experienced game-session, a live collaborative engagement of users, an e-shopping session, a digital auction, a crowdfunding activity, a social environment, a sports event, a cultural event, a social event, a television show, a political speech, a live conference, or a board meeting.

8. The system of claim 1, wherein the immersive experiences enable a plurality of remote viewers to be virtually transported to a live event and further enables a virtual event to be projected and mapped against surrounding areas of the at least one plurality of remote viewers.

9. The system of claim 1, wherein the viewer feedback is presented within the interactive environment, is recorded by the recording equipment, and is transferred back to the at least some remote viewers, thereby creating an immediate response on the viewer feedback.

10. The system of claim 1, wherein the plurality of interactive environments comprises both physical environments hosting the live event and computer-generated, virtual environments in which the live event is taking place.

11. The method of claim 1, further comprising virtually transporting one or more viewers to a live event, or projecting and mapping a live event against surrounding areas of the one or more viewers.

12. The system of claim 1, wherein the passive manipulation instructions permit the at least some remote viewers to access one or more details of the one or more interactive elements.

13. The system of claim 1, wherein the active manipulation instructions permit the at least some remote viewers to directly affect a course of action within the live event.

14. The system of claim 13, wherein the immersive experiences are updated to reflect the course of action within the live event being affected, and wherein the updated immersive experiences are presented to the at least some remote viewers, thereby displaying immediate feedback to the at least some remote viewers.

15. The system of claim 13, wherein a result of the at least some remote viewers directly affecting the course of action within the live event is presented at the live event.

16. The system of claim 1, wherein the persistent virtual world system is accessed from storage so that at least one of the plurality of interactive live environments is streamed to one or more additional remote viewers.

17. A method for remote participation in live events, comprising:
providing a plurality of interactive environments, each interactive environment hosting a live event;
providing recording equipment to record the live event in the corresponding interactive environment;
continuously recording the live event in the corresponding interactive environment;
sending the recording of the live event in the corresponding interactive environment to one or more remote servers, each of the one or more remote servers comprising at least a processing unit, memory, and at least one renderer, wherein the memory of the server stores a persistent virtual world system comprising at least one virtual replica of a corresponding real object, wherein the virtual 3D world coordinates and virtual properties of the virtual replicas are based on the 3D world coordinates and properties of the real objects, and wherein the plurality of interactive live environments is continuously updated in the persistent virtual world system;
processing, by the at least one processing unit, the recording to generate interactive volumes on interactive elements;
generating, by the at least one processing unit, immersive experiences comprising the interactive volumes on the interactive elements;
rendering, by the at least one renderer, the immersive experiences to generate immersive media streams;
sending the immersive data streams to one or more remote viewers;
permitting the one or more remote viewers to interact with the immersive experiences on one or more interaction devices that display the immersive media streams, thereby generating viewer feedback on the immersive experiences;
receiving the viewer feedback;
executing, by the processing unit, the passive manipulation instructions to only update the immersive experiences sent to at least one of the one or more remote viewers via the immersive data streams, and/or executing, by the processing unit, the active manipulation instructions to update the live event along with the immersive experiences; and
updating, by the at least one processing unit and renderer, the interactive environment by initiating an action within the interactive environment, or updating the immersive content on the processed feedback, or combinations thereof.

18. The method of claim 10, further comprising updating, by the processing unit based on the feedback, the interactive environment, or of the immersive content, or combinations thereof sent to remote and local viewers.

19. The method of claim 10, further comprising asynchronously organizing communication with the plurality of remote viewers using a middleware module, wherein the middleware module is configured to expose a plurality of network connections for receiving the feedback of the remote viewers and transferring processed data to the determined interactive environment of the plurality of interactive environments, wherein the middleware module is further configured to filter all requests and feedback of one remote viewer, in the plurality of remote viewers, that is participating in more than one live event towards a correct live event session so that data is stored and processed in connection to a respective live event session.

20. The method of claim 10, further comprising providing one or more feedback channels, each feedback channel configured to transfer feedback associated with one of the interactive environments.

21. The method of claim 10, wherein the equipment configured to record the interactive event comprises one or more Light Detection and Ranging (LIDAR) devices configured to provide precise distance and depth information of the live event to the renderer.

22. The method of claim 10, further comprising, based on the received feedback, generating a visual representation and updating the interactive environment by displaying the visual representation within the interactive environment.

23. A non-transitory computer-readable medium having instructions stored thereon, wherein the instructions, when installed and executed on a computing device, cause the computing device to:

provide a plurality of interactive environments, each interactive environment hosting a live event;

utilize recording equipment to record the live event in the corresponding interactive environment;

continuously record the live event in the corresponding interactive environment;

send the recording of the live event in the corresponding interactive environment to one or more remote servers, each of the one or more remote servers comprising at least a processing unit, memory and at least one renderer, wherein the memory of the server stores a persistent virtual world system comprising at least one virtual replica of a corresponding real object, wherein the virtual 3D world coordinates and virtual properties of the virtual replicas are based on the 3D world coordinates and properties of the real objects, and wherein the plurality of interactive live environments is continuously updated in the persistent virtual world system;

process, by the at least one processing unit, the recording to generate interactive volumes on interactive elements;

generate, by the at least one processing unit, immersive experiences comprising the interactive volumes on the interactive elements;

render, by the at least one renderer, the immersive experiences to generate immersive media streams;

send the immersive data streams to one or more remote viewers;

permit the one or more remote viewers to interact with the immersive experiences on one or more interaction devices that display the immersive media streams, thereby generating viewer feedback on the immersive experiences;

receive the viewer feedback;

execute, by the processing unit, the passive manipulation instructions to only update the immersive experiences sent to at least one of the one or more remote viewers via the immersive data streams, and/or execute, by the processing unit, the active manipulation instructions to update the live event along with the immersive experiences; and update, by the at least one processing unit and renderer, the interactive environment by initiating an action within the interactive environment, or updating the immersive content on the processed feedback, or combinations thereof.

* * * * *